(12) United States Patent
Kawano (10) Patent No.: US 11,843,739 B2
(45) Date of Patent: *Dec. 12, 2023

(54) INFORMATION PROCESSING DEVICE FOR REFLECTING AN EDITABLE TAB RECEIVED FROM AN EXTERNAL DEVICE ON A SETTINGS SCREEN

(71) Applicant: SHARP KABUSHIKI KAISHA, Sakai (JP)

(72) Inventor: Shinichi Kawano, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/950,604

(22) Filed: Sep. 22, 2022

(65) Prior Publication Data

US 2023/0017098 A1    Jan. 19, 2023

Related U.S. Application Data

(63) Continuation of application No. 17/511,510, filed on Oct. 26, 2021, now Pat. No. 11,489,978.

(30) Foreign Application Priority Data

Nov. 11, 2020   (JP) .................................. 2020-188154

(51) Int. Cl.
  *G06F 3/12*    (2006.01)
  *H04N 1/00*    (2006.01)
(52) U.S. Cl.
  CPC ....... *H04N 1/00517* (2013.01); *G06F 3/1204* (2013.01); *G06F 3/1254* (2013.01); *H04N 1/00395* (2013.01)

(58) Field of Classification Search
  CPC ........... H04N 1/00395; H04N 1/00432; H04N 1/00517; G06F 3/1204; G06F 3/1254;
  (Continued)

(56) References Cited

U.S. PATENT DOCUMENTS

2010/0199209 A1  8/2010  Sueoka et al.
2010/0199210 A1  8/2010  Harada et al.
(Continued)

FOREIGN PATENT DOCUMENTS

| JP | 2010-165300 A | 7/2010 |
| JP | 2016-45788 A  | 4/2016 |
| JP | 2016-99822 A  | 5/2016 |

OTHER PUBLICATIONS

Notice of Allowance of U.S. Appl. No. 17/511,510 dated Jun. 29, 2022.

*Primary Examiner* — Kent Yip
(74) *Attorney, Agent, or Firm* — ScienBiziP, P.C.

(57) ABSTRACT

The present invention is an information processing device in which a printer driver for causing an image forming device to perform processing according to items is installed, and which is provided with an editable tab on a settings screen of the printer driver such that the items can be selected by a user. The information processing device includes a controller that, in a state where information about the editable tab has been registered in the image forming device by an administrator, and an acquisition request for information about the registered editable tab has been made from the printer driver to the image forming device, causes information about the registered editable tab to be transmitted to the information processing device, and causes the transmitted information to be reflected in the editable tab of the printer driver.

19 Claims, 8 Drawing Sheets

(58) Field of Classification Search
CPC .... G06F 3/1205; G06F 3/1253; G06F 3/1285; G06F 3/1203
USPC .............................................. 358/1.13, 1.15
See application file for complete search history.

(56) References Cited

U.S. PATENT DOCUMENTS

| | | | |
|---|---|---|---|
| 2010/0199211 A1* | 8/2010 | Igawa | H04N 1/00472 715/777 |
| 2013/0332311 A1 | 12/2013 | Pu et al. | |
| 2016/0054956 A1* | 2/2016 | Otsuka | G06F 3/1231 358/1.13 |

* cited by examiner

260: ADMINISTRATOR

10: MFP

S100: REGISTER FAVORITES INFORMATION

S110, S120: REQUEST REGISTERED FAVORITES INFORMATION

200: PC

230

S130: TRANSMIT REGISTERED FAVORITES INFORMATION

INFORMATION PROCESSING DEVICE FOR REFLECTING AN EDITABLE TAB RECEIVED FROM AN EXTERNAL DEVICE ON A SETTINGS SCREEN

BACKGROUND OF THE INVENTION

Field of the Invention

The present disclosure relates to an information processing device, an information processing system, a control method, and a recording medium storing a program that acquire and reflect information from an image forming device about a favorites tab of a printer driver.

Description of the Background Art

Conventionally, for the purpose of improving user operability of a settings screen of a printer driver, a technique has been proposed that provides a fixed tab in which selected items are determined and arranged in advance, and an editable tab (personal tab) in which a user is capable of freely specifying and arranging the selected items, and performs setting of the personal tab based on information held by the printer driver itself (see Japanese Unexamined Patent Application Publication No. 2010-165300, Japanese Unexamined Patent Application Publication No. 2016-45788, and Japanese Unexamined Patent Application Publication No. 2016-99822).

However, the editable tab was not changed in consideration of the state of an optional configuration of the image forming device that performs the printing.

In order to solve the above problem, the present disclosure provides an information processing device, an information processing system, a control method, and a recording medium storing a program that enable the setting of an editable tab that can be executed by an image forming device by acquiring information about the editable tab from the image forming device.

SUMMARY OF THE INVENTION

The present disclosure is an information processing device in which a printer driver for causing an image forming device to perform processing according to an item is installed, and which is provided with an editable tab on a settings screen of the printer driver such that an item can be selected by a user, the information processing device comprising: a requester that, in a state where information about the editable tab has been registered in the image forming device by an administrator, makes an acquisition request for information about the registered editable tab from the printer driver to the image forming device; a receiver that receives the information about the registered editable tab transmitted by the image forming device in response to the acquisition request; and a reflector that causes the received information about the editable tab to be reflected in an editable tab of the printer driver.

The present disclosure is an information processing system comprising an image forming device and an information processing device, wherein the information processing device has a printer driver installed for causing an image forming device to perform processing according to an item, and is provided with an editable tab on a settings screen of the printer driver such that an item can be selected by a user, and the information processing device includes a requester that, in a state where information about the editable tab has been registered in the image forming device by an administrator, makes an acquisition request for information about the registered editable tab from the printer driver to the image forming device; a receiver that receives the information about the registered editable tab transmitted by the image forming device in response to the acquisition request; and a reflector that causes the received information about the editable tab to be reflected in an editable tab of the printer driver.

The present disclosure is a control method of an information processing device in which a printer driver for causing an image forming device to perform processing according to an item is installed, and which is provided with an editable tab on a settings screen of the printer driver such that an item can be selected by a user, the method comprising: acquisition requesting for making, in a state where information about the editable tab has been registered in the image forming device by an administrator, an acquisition request for information about the registered editable tab from the printer driver to the image forming device; receiving for receiving the information about the registered editable tab transmitted by the image forming device in response to the acquisition request; and reflecting for causing the received information about the editable tab to be reflected in an editable tab of the printer driver.

The present disclosure is a recording medium storing a program that controls an information processing device in which a printer driver for causing an image forming device to perform processing according to an item is installed, and which is provided with an editable tab on a settings screen of the printer driver such that an item can be selected by a user, the program causing a computer to realize: a function that, in a state where information about the editable tab has been registered in the image forming device by an administrator, makes an acquisition request for information about the registered editable tab from the printer driver to the image forming device; a function that receives the information about the registered editable tab transmitted by the image forming device in response to the acquisition request; and a function that causes the received information about the editable tab to be reflected in an editable tab of the printer driver.

In the present disclosure, when an acquisition request for information about an editable tab is made from a printer driver, the request causes information about an editable tab that has been registered in the image forming device to be transmitted to the information processing device, and causes the transmitted information to be reflected in the editable tab of the printer driver. Therefore, a superior effect can be obtained in which an editable tab that can be executed by the image forming device can be appropriately set.

DESCRIPTION OF THE PREFERRED EMBODIMENTS

Hereinafter, embodiments will be described with reference to the accompanying drawings.

1. First Embodiment

1.1 Overall Configuration (System Configuration)

First, a configuration of an image forming device 10 according to an embodiment will be described.

The embodiment relates to an information processing device provided with an editable tab that can be specified by a user, the editable tab being on a settings screen of a printer driver that gives printing instructions to an image forming device.

The following embodiment is a specific example of the present disclosure and does not limit the technical scope to the embodiment.

Figure 1:
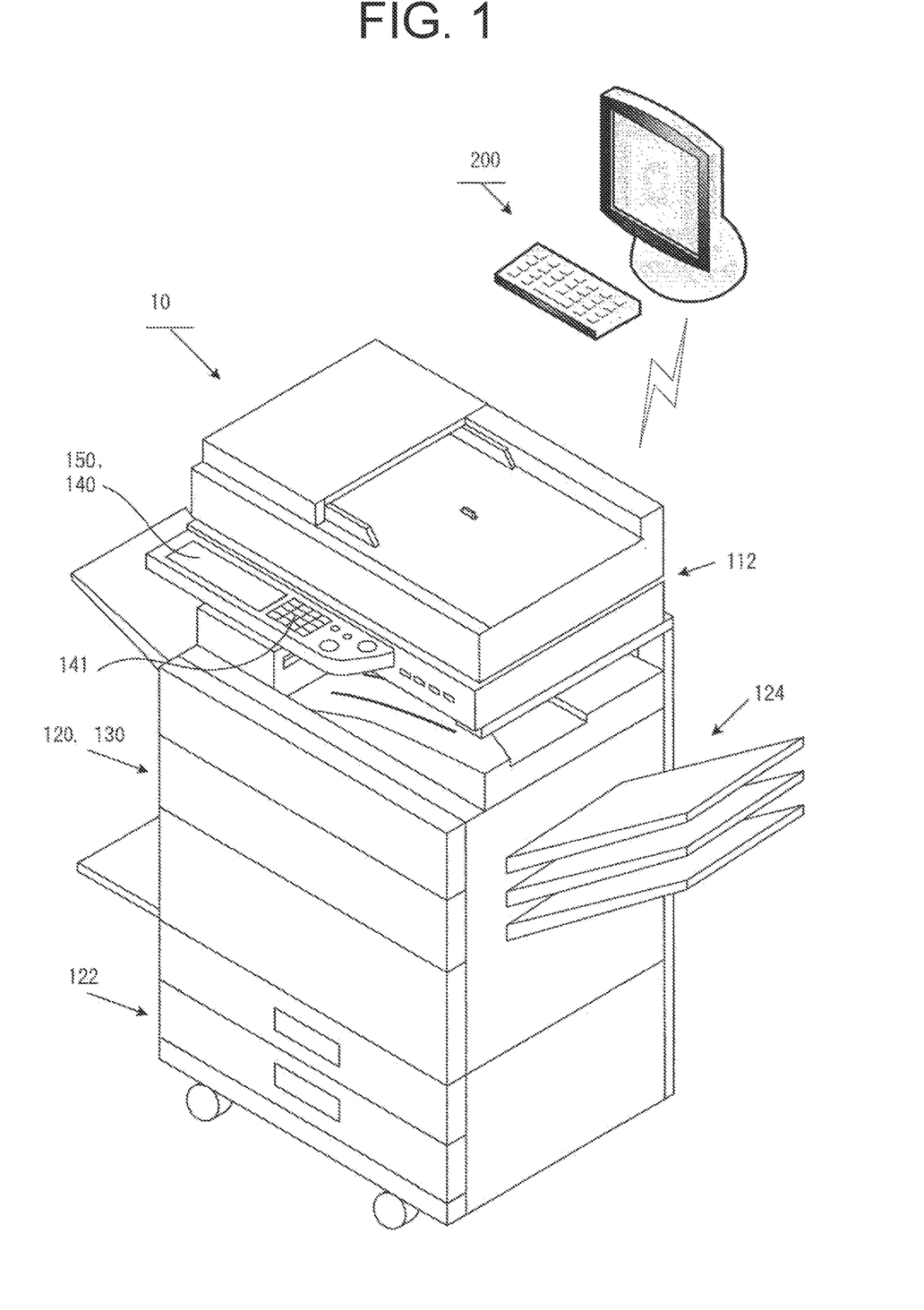
FIG. 1 is an explanatory view illustrating a configuration of an information processing device and an image forming device according to an embodiment.

As shown in FIG. 1, the image forming device 10 according to the embodiment is a multifunction printer (MFP) that, in addition to functioning as a copy machine by being provided with a document reader 112 in the upper part of the image forming device 10, and outputting an image by an electrographic method by reading a document image, exhibits various functions such as a printer function that outputs data as an image, a facsimile function, and a scanner function.

This is an example, and the image forming device can be another type of image forming device such as a printer device or a copy machine.

The information processing device 200 is a computer in which a printer driver that causes the image forming device 10 to perform the printer function and various editing functions (software that makes the printer function usable) is installed.

An administrator of the image forming device 10 is capable of using administrator privileges to set optional functions of the image forming device 10 from a terminal device (not shown).

1.2 Functional Configuration

Figure 2:
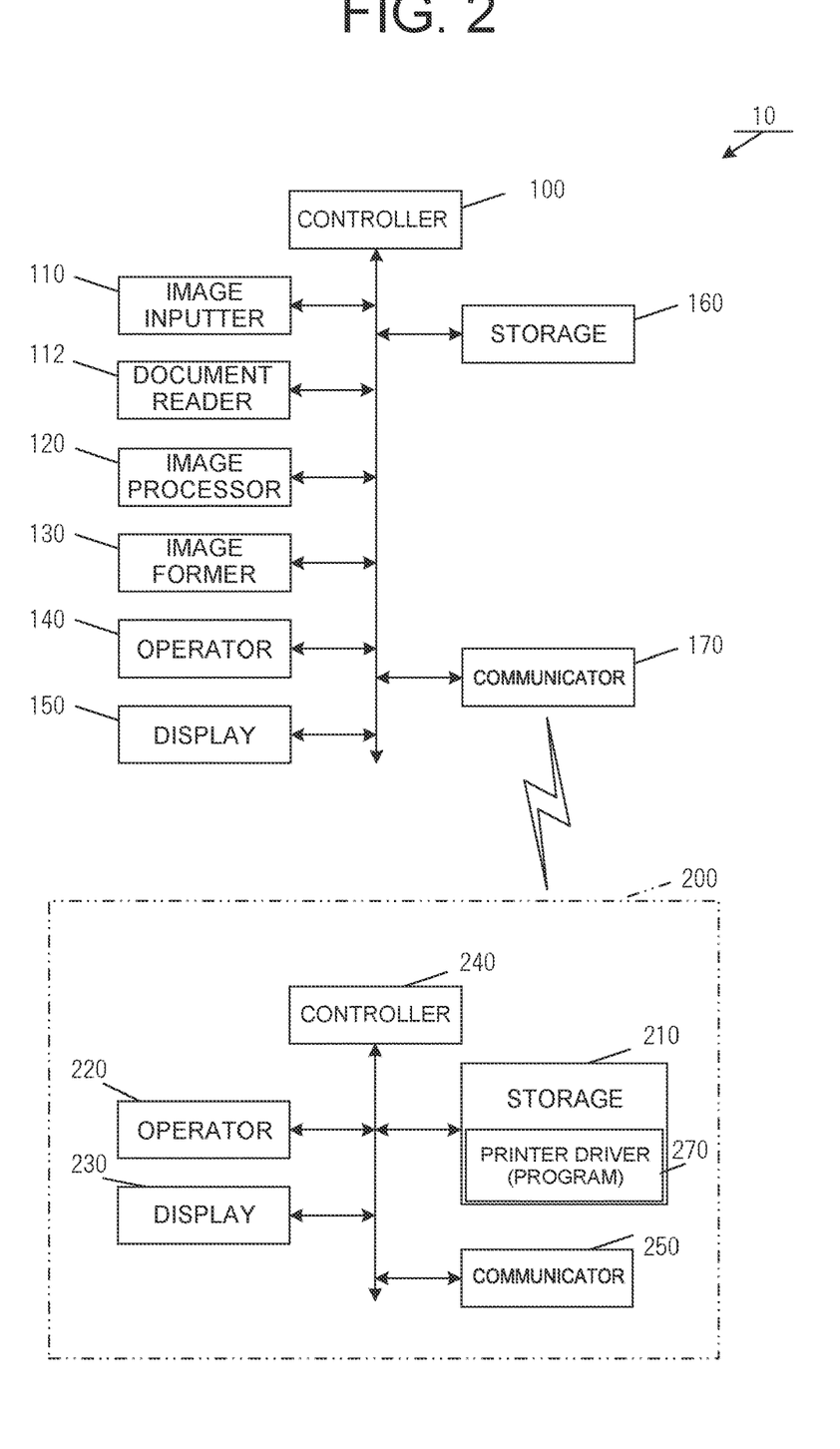
FIG. 2 is a control block diagram of the information processing device and the image forming device of FIG. 1.

As shown in FIG. 2, the image forming device 10 mainly includes a controller 100, an image inputter 110, a document reader 112, an image processor 120, an image former 130, an operator 140, a display 150, a storage 160, and a communicator 170.

The controller 100 is a functional unit for controlling the entire image forming device 10.

Further, the controller 100 realizes various functions by reading and executing various programs, and is configured with, for example, one or more arithmetic devices (for example, a CPU (Central Processing Unit)) or the like.

The image inputter 110 is a functional unit for reading image data input to the image forming device 10.

In addition, the image inputter 110 is connected to the document reader 112, which is a functional unit that reads a document image, and receives image data output from the document reader 112.

Moreover, the image inputter 110 may receive image data from a storage medium such as a USB 2.0 memory or an SD card.

Also, the image inputter 110 may receive image data from another terminal device via the communicator 170, which connects to other terminal devices.

The document reader 112 has a function of optically reading a document placed on a contact glass (not shown), and passing the scan data to the image processor 120.

The image former 130 is a functional unit for forming output data based on the image data on a recording medium (for example, recording paper).

For example, as shown in FIG. 1, the recording paper is fed from a paper feed tray 122, and after an image is formed on the surface of the recording paper in the image former 130, the recording paper is ejected to a paper discharge tray 124.

The image former 130 is constituted by, for example, a laser printer or the like that uses an electrophotographic method.

The image processor 120 has a function of performing a conversion to a set file format (such as TIFF, GIF, JPEG, or the like) based on the image data read by the document reader 112.

Then, the image processor 120 forms an output image based on the image data subjected to image processing.

The operator 140 is a functional unit for receiving an operation instruction from a user, and is configured by various key switches, devices that detect input by contact, and the like.

A user uses the operator 140 to input the functions and output conditions to be used.

The display 150 is a functional unit for displaying various types of information to the user, and is configured, for example, by an LCD (Liquid Crystal Display).

That is to say, the operator 140 provides a user interface for operating the image forming device 10. The display 150 displays various setting menu screens of the image forming device and messages.

As shown in FIG. 1, the image forming device 10 may include, as the configuration of the operator 140, a touch panel in which an operation panel 141 and the display 150 are integrally formed.

In this case, the method of detecting inputs on the touch panel may be a general detection method, such as a resistive method, an infrared method, an electromagnetic induction method, or an electrostatic capacitive method.

The storage 160 is a functional unit that stores various programs including a control program necessary for the operation of the image forming device 10, various data including the read data, and user information.

The storage 160 includes, for example, a non-volatile ROM (Read Only Memory), a RAM (Random Access Memory), an HDD (Hard Disk Drive), and the like.

Furthermore, the storage 160 may also include an SSD (Solid State Drive), which is a semiconductor memory.

The communicator 170 provides a communication connection with an external device.

A communication interface (communication I/F) used to send and receive data is provided as the communicator 170.

As a result of the communication I/F, a user operation made with respect to the image forming device 10 allows the data stored in the storage of the image forming device 10 to be sent and received by another computer connected via a network.

As shown in FIG. 2, the information processing device 200 is a personal computer (PC) that executes various functions by means of a program, and has an installed printer driver.

The information processing device 200 sends and receives data with respect to the image forming device 10 from the communicator 250 via the communicator 170.

The information processing device 200 includes: a storage 210 having a function of storing various programs, including a control program such as a printer driver necessary for operation of the image forming device 10, various data of the editable tab, and user information and the like; an operator 220 that provides a user interface such as a keyboard and a mouse; a display 230 such as a liquid crystal display device that displays various setting menu screens such as tabs; a controller 240 that realizes various functions, such as control of the image processing device, by reading and executing various programs for controlling the information processing device 200; and a communicator 250 of a communication interface (communication I/F) used to transmit and receive data with respect to the image forming device 10 (via the communicator 170) by means of a wired or wireless LAN (Local Area Network) line.

The editable tab is also referred to as a "favorites tab" or "personal tab" in order to handle user preferences and requests.

The information processing device 200 has a printer driver installed to cause the image forming device 10 to perform processing according to items. A settings screen of the printer driver is provided with the editable tab that enables the user to select the item.

As shown in FIG. 2, the printer driver 270 is stored as a program in the storage 210. The functions of the printer driver 270 are realized as a result of the controller 240 executing the program.

As a result executing a program in a state where information about the editable tab has been registered in the image forming device 10 by an administrator, the controller 240 realizes the functions of: a requester 240*a* that makes an acquisition request from the printer driver 270 for information about the editable tab registered in the image forming device 10; a receiver 240*b* that receives the information about the registered editable tab that has been transmitted by the image forming device 10 in response to the acquisition request; and a reflector 240*c* that causes the received information about the editable tab to be reflected in the editable tab of the printer driver 270.

In the settings screen of the printer driver displayed on the display 230, the information processing device 200 provides a fixed tab in which a selected item is determined and arranged in advance (a tab being a Tabbed Document Interface), and an editable tab in which the user can freely specify and edit an item.

1.3 Process Flow

The processing performed by the information processing device 200 will be described.

Figure 3:
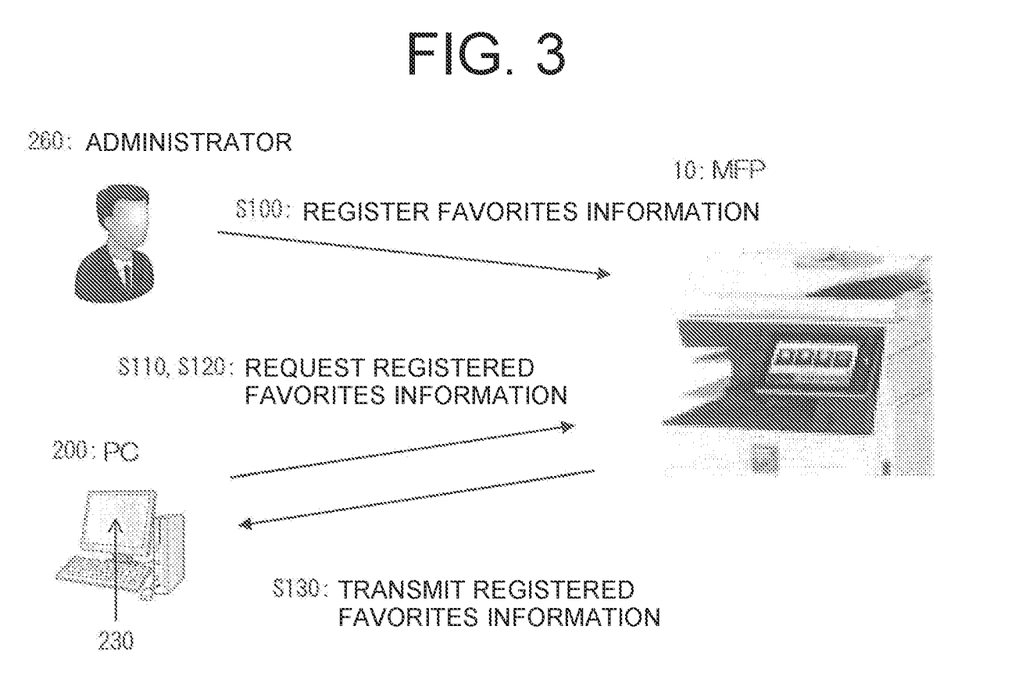
FIG. 3 is a conceptual diagram of the processing performed by the information processing device according to an embodiment.

FIG. 3 is a conceptual diagram illustrating the processing performed by the information processing device 200. In the diagram, step 100 is abbreviated as S100, and the same applies to each subsequent step.

Note that, in FIG. 3 to FIG. 8, the editable tab is referred to a "favorites tab", the image forming device 10 is referred to as an "MFP", and the information processing device is referred to as a "PC".

In the first embodiment, information about the editable tab of the printer driver is registered in the image forming device 10 by an administrator (step 100). When an acquisition request for the editable tab is made from the printer driver (steps 110 and 120), the controller 240 transmits the information about the editable tab registered in the image forming device 10 to the information processing device 200, and causes the transmitted information to be reflected in the editable tab of the printer driver (S130).

1.4 Operation Example

Figure 4:
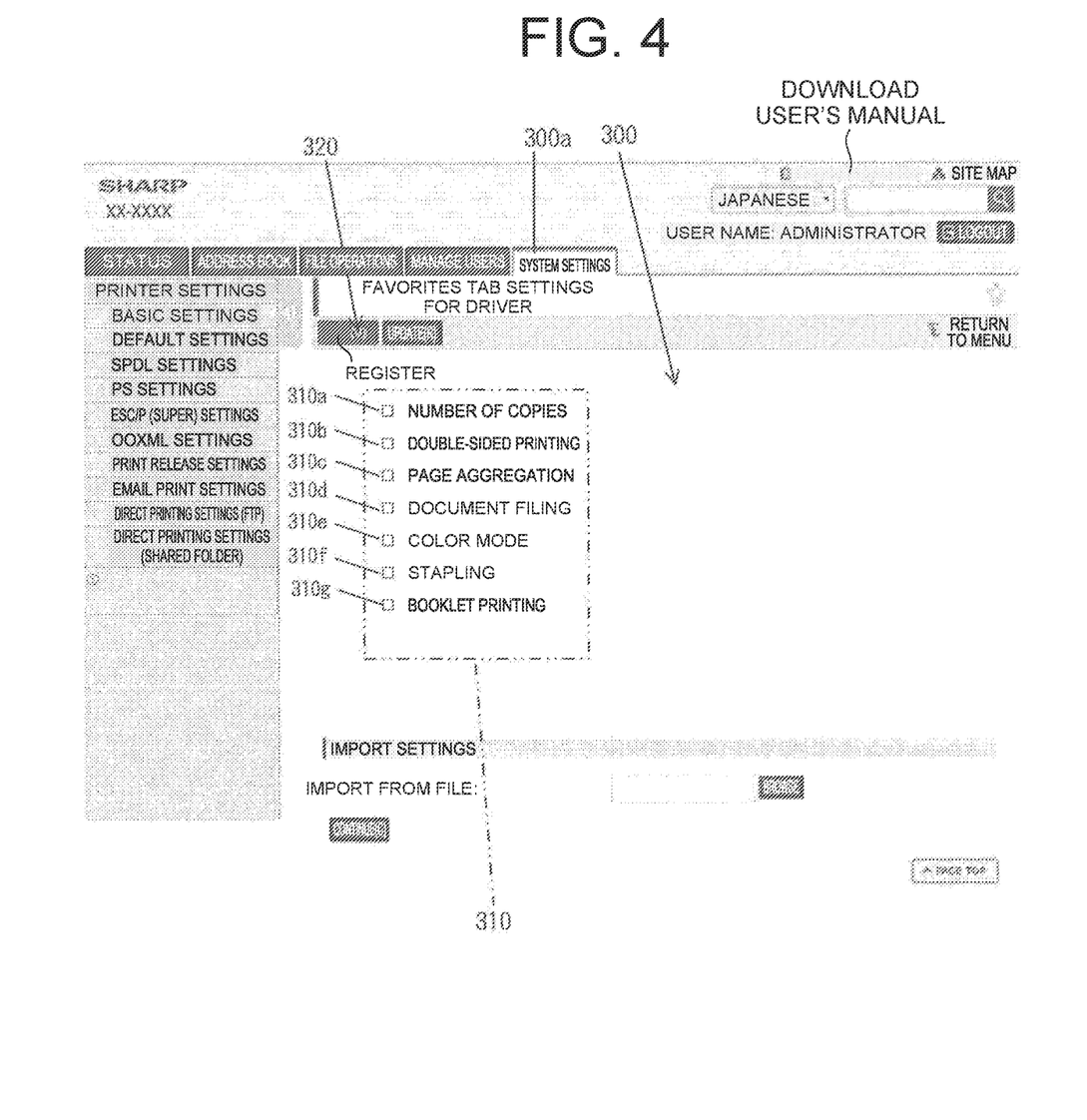
FIG. 4 is a control sequence diagram of the information processing device according to an embodiment.
Figure 5:
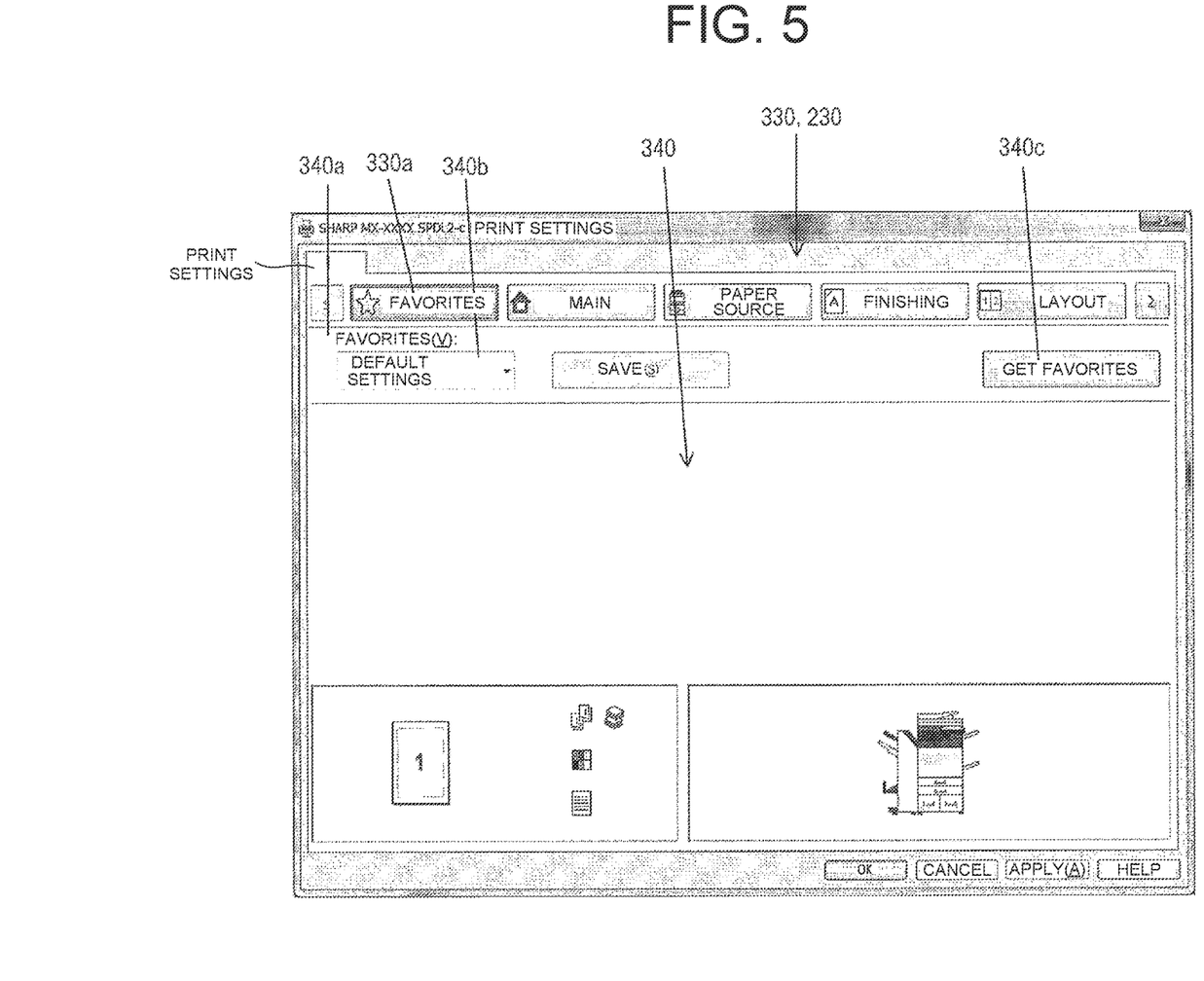
FIG. 5 is an explanatory view of a screen on which an administrator sets an editable tab with respect to the image forming device.
Figure 6:
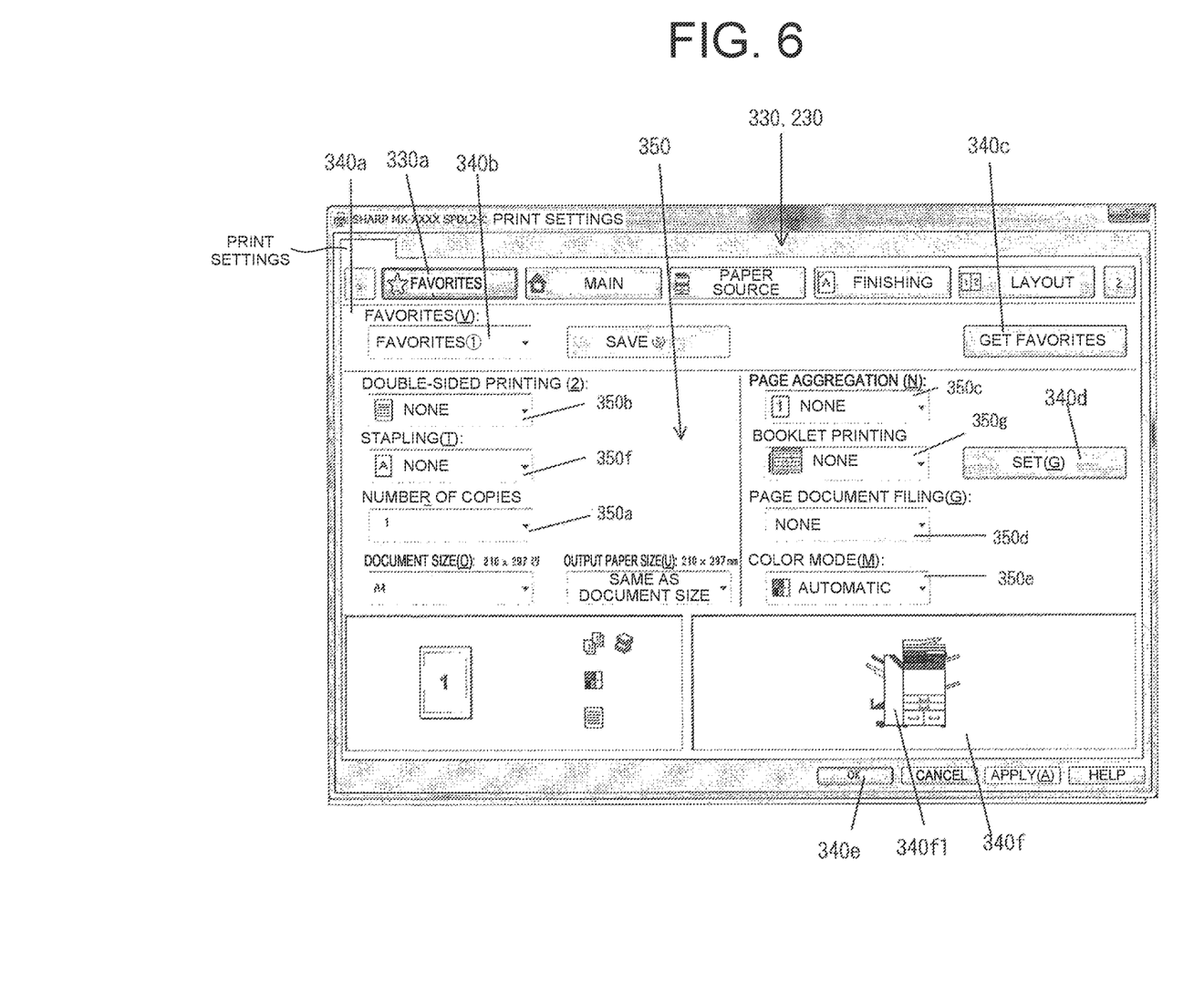
FIG. 6 is an explanatory view of an example of a screen of a printer driver of the information processing device prior to acquisition of information about an editable tab.

FIG. 4 shows an example of a screen on which an administrator sets an editable tab in the image forming device. FIG. 5 shows an example of a screen of the printer driver of the information processing device 200. FIG. 6 shows an example of a screen in which information about the editable tab (favorites tab) acquired from the image forming device has been reflected in the editable tab of the printer driver.

An administrator 260 sets the optional item of the editable tab (S100).

In this case, the administrator sets the optional item by logging in with an administrator account (administrator ID and password) to open a screen of a web page of the image forming device 10 (which is configured by an embedded system) from a web browser.

The registration of information about the editable tab in the image forming device 10 is only possible for items which are based on an optional configuration that can be used by the image forming device 10.

Furthermore, the registration of information about the editable tab in the image forming device 10 allows the administrator to set an item for which use by a user is restricted, or an item which is recommended to be used by a user.

As shown in FIG. 4, on the screen of the web page, the optional functions of the image forming device 10 are set by opening a system page 300 by pressing a system settings tab 300*a*, and then selecting [Favorites Tab Settings of Driver].

On the system page 300, items 310 for functions that correspond to the optional functions are arranged alongside a plurality of square [Checkboxes] 310*a* to 310*g*.

The items 310 that can be selected in this case include the number of copies 310*a*, double-sided printing 310*b*, page aggregation 310*c*, document filing 310*d*, color mode 310*e*, stapling 310*f*, and booklet printing 310*g*.

The administrator 260 can select the items corresponding to the desired functions by entering "tick" checkmarks in the [Checkboxes] 310*a* to 310*g* for those items 310 displayed on the screen of the system page 300 corresponding to function items to be set in the image forming device 10.

After selecting the items, the administrator can register the selected items in the image forming device 10 as information about the editable tab (favorites tab) by pressing the [Register] button 320.

As shown in FIG. 3 and FIG. 5, when a user uses the printer driver 270, the user opens a print settings screen 330 of the printer driver on the display 230 of the information processing device 200, and an initial settings screen 340 of the editable tab (favorites tab) is displayed on the print settings screen 330 by pressing the [Favorites] button 330*a* (S110).

As shown in FIG. 5, because the items of the editable tab are not set in the displayed initial settings screen, functional setting items are not displayed. However, a text display of [Favorites] 340*a* is displayed, and the text [Default Settings] is displayed in a pull-down menu 340*b*. In addition, a [Get Favorites] button 340*c* is displayed.

Next, as a result of the user pressing the [Get Favorites] button 340*c* on the initial settings screen 340, the printer driver 270 transmits a request to the image forming device 10 to acquire information about the editable tab (favorites tab) (S120).

Then, the image forming device 10 transmits the settings information of the registered editable tab (favorites tab) to the printer driver 270 (S130).

As shown in FIG. 6, the printer driver 270 acquires the settings information of the editable tab and displays a screen reflecting the acquired information about the editable tab on the print settings screen 330.

On the screen 350 in which this information has been reflected, the text display of the pull-down menu 340*b* is updated to [Favorites].

Then, a [Number of Copies] pull-down menu 350*a*, a [Double-Sided Printing] pull-down menu 350*b*, a [Page Aggregation] pull-down menu 350*c*, a [Document Filing] pull-down menu 350*d*, a [Color Mode] pull-down menu 350*e*, a [Stapling] pull-down menu 350*f*, and a [Booklet Printing] pull-down menu 350*g* are displayed as items of the editable tab (favorites tab).

To change the menu of each item, the item is set by pressing a [Set] button 340*d* after making a selection in the pull-down menu, and the [OK] button 340*e* is pressed to register the change.

Thereafter, the printer driver 270 is capable of causing the image forming device 10 to execute printing according to the registered contents.

In this case, the image forming device 10 is equipped with a finisher as an optional function. Therefore, an illustration of the image forming device 10 equipped with a finisher 340*f*1 is displayed in a function display area 340*f*.

Furthermore, the [Stapling] pull-down menu 350*f*, which is a stapling function item, is also displayed.

Such displays enable the user to easily recognize that the image forming device is currently equipped with finisher functions.

1.5 Effects

As a result of acquiring, from the image forming device 10, information about the editable tab (favorites tab) registered in the image forming device 10 by an administrator, it is possible to set an editable tab (favorites tab) having the appropriate functions for the image forming device 10 to the printer driver.

Furthermore, in the first embodiment, when information about the favorites tab of the printer driver is registered in the image forming device 10, an administrator may restrict an item in the editable tab which is not desired to be used by a user, or may set an item which is desired to be used.

In this way, at the time the settings are made, when information about the favorites tab of the printer driver is registered in the image forming device, an administrator may restrict items in the editable tab which is not desired to be used by a user, or may set items which is desired to be used.

2. Second Embodiment

Next, a second embodiment will be described.

Figure 7:
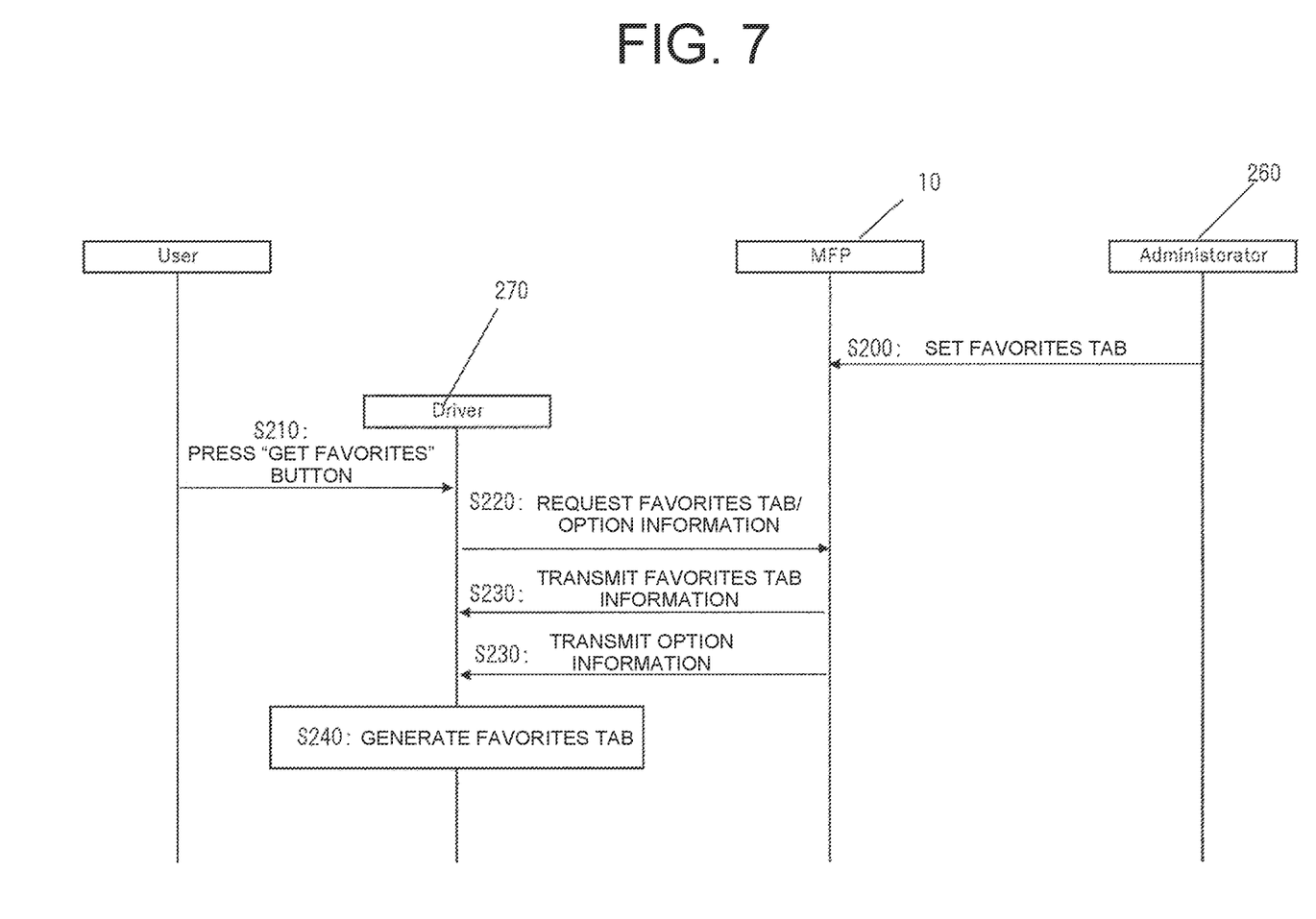
FIG. 7 is an explanatory view of an example of a screen of the printer driver after acquisition of information about an editable tab.
Figure 8:
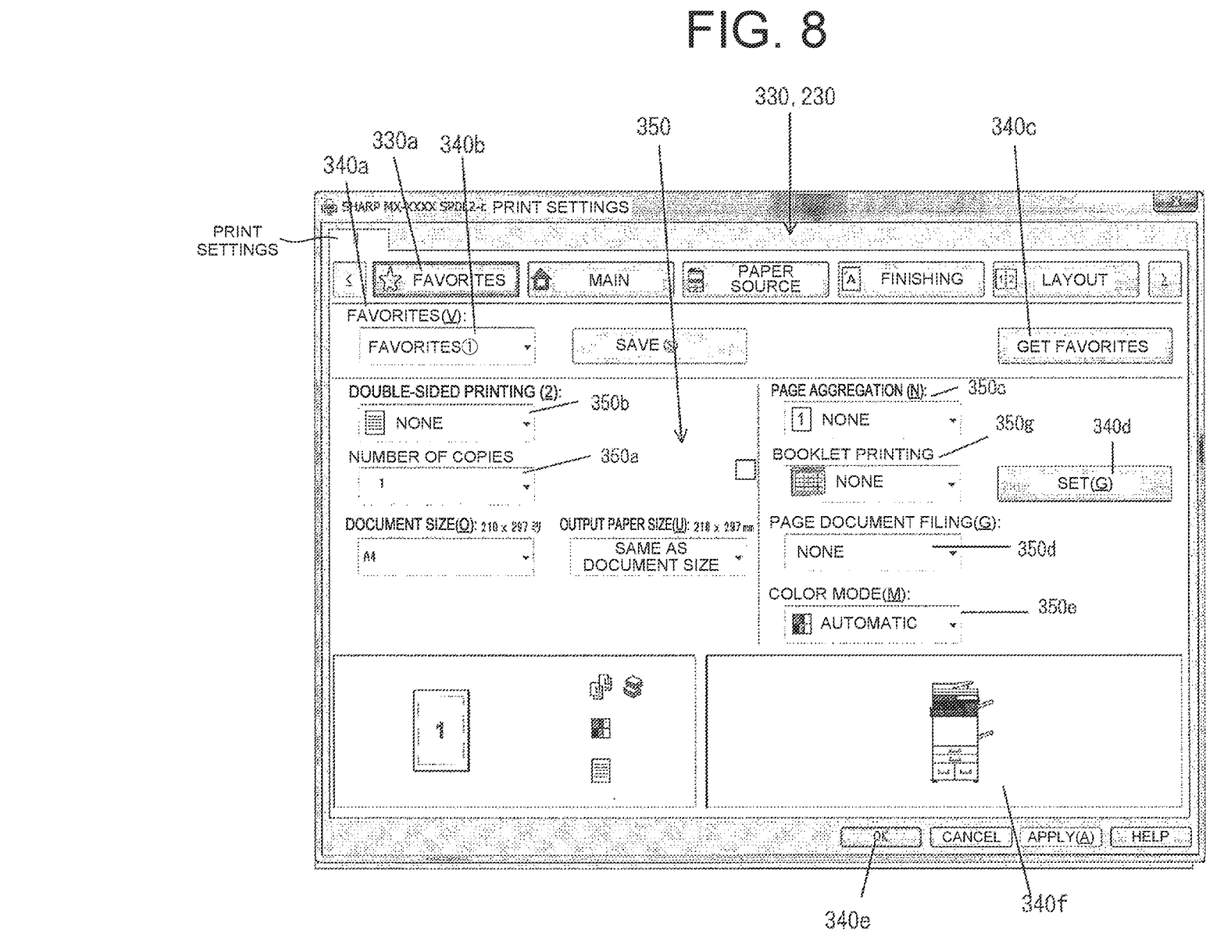
FIG. 8 is an explanatory view of an example of another screen of the printer driver after acquisition of information about an editable tab.

FIG. 7 shows a control sequence diagram for a case where an administrator has changed the configuration of the editable tab. FIG. 8 shows a screen that reflects the changes made in FIG. 7 in the editable tab of the printer driver.

The same reference numerals are given to the same components as in the first embodiment.

In the second embodiment, when information about the editable tab of the printer driver is registered in the image forming device 10, it is only possible to register settings based on an optional configuration that can be used in the image forming device 10.

As shown in FIG. 7, the administrator 260 sets the items 310 corresponding to the optional functions in the editable tab (favorites tab) by means of the settings screen (system page 300) shown in FIG. 4 (S200).

In the initial settings screen 340 of the printer driver 270 (see FIG. 5), when the user presses the [Get Favorites] button 340*c* (S210), the printer driver 270 makes a request to the image forming device 10 side for the editable tab (favorites tab) and option information (S220).

The image forming device 10 transmits information about the editable tab (favorites tab) set by an administrator and optional functions that can be executed by the image forming device to the printer driver 270 (S230).

If the optional functions of the image forming device are changed after the settings made by the administrator 260, or if they differ from the originally set items, the editable tab set by the administrator will differ from the optional functions that can be executed by the image forming device.

The printer driver 270 compares the acquired information about the editable tab (favorites tab) with information about the optional functions, and displays an editable tab that can be executed by the image forming device on the screen (S240).

For example, in response to a request for the favorites tab registered by an administrator and option information, the following occurs when an administrator has set a stapling function in the favorites tab at the time of setting the favorites.

If the image forming device does not have a finisher when the [Get Favorites] button 340*c* is pressed, the option information is also transmitted from the image forming device 10 after the favorites information. Then, as shown in FIG. 8, if it is determined by the processing in the printer driver that there is no finisher, a screen is displayed in which stapling is not displayed as an item in the [Favorites Tab].

In this case, the image forming device 10 is not equipped with a finisher as an optional function. Therefore, an illustration of the image forming device 10 which is not equipped with a finisher is displayed in the function display area 340*f*.

Furthermore, a [Stapling] pull-down menu is not displayed as a stapling function item.

Such a display mode enables the user to easily recognize that the image forming device does not currently have finisher functions.

According to the second embodiment, information about the editable tab can only be registered in the image forming device for items based on the optional configuration that can be used in the image forming device. Therefore, the editable tab can be reflected in the printer driver based on the optional configuration of the image forming device, and print settings can be set that correspond to the image forming device 10 that is to be used.

3. Third Embodiment

In the third embodiment, the controller 240 sets a restriction on the editable tab to reflect the information transmitted from the image forming device 10 according to a user permission.

In the printer driver settings, the items to be displayed in the editable tab are restricted in advance by attaching conditions or the like.

The conditions preferably set a restriction on the functions that are capable of printing according to a user permission.

User A can perform page aggregation but not stapling. Meanwhile, User B can perform page aggregation but not stapling.

When the work content differs depending on the user, it is possible to execute restricted jobs according to the work content, and it is possible to print according to the work content to eliminate waste.

4. Fourth Embodiment

In the fourth embodiment, the controller 240 preferably provides the editable tab of the printer driver with a standard configuration, and sets the editable tab of the printer driver to the standard configuration prior to an acquisition request for the editable tab from the printer driver, and when an acquisition request for the editable tab is made from the printer driver, reflects the configuration of the editable tab transmitted from the image forming device in the editable tab of the printer driver in place of the standard configuration.

In the first embodiment, nothing is displayed in the editable tab as shown in FIG. 5 until an acquisition request for the editable tab is made from the printer driver. Then, each of the function items in the editable tab appear after the acquisition request is made.

In contrast, in the fourth embodiment, when the editable tab is displayed in the printer driver, the editable tab can be set by default without pressing the [Get Favorites] button 340c. In this display mode, the various functions set in the image forming device are changed when the acquisition request is made.

If some of the functions on the default screen cannot be executed, those functions cannot be executed even when printing is started. Therefore, the [Get Favorites] button 340c is pressed again at that time to acquire the editable tab.

If the functions on the default screen can be executed, the functions can be executed without spending time the time to make an acquisition request. Therefore, it is possible to speed up the process.

5. Modifications

As a modification of the first to third embodiments, the acquisition of the editable tab may be made by an acquisition request at the same time as the opening of the printer driver.

In this way, the editable tab can be acquired at the same time as the opening of the printer driver screen. Therefore, it is possible to acquire the editable tab without pressing the [Get Favorites] button 340c again, and the operation time can be shortened.

The embodiments described above can be applied to various image forming devices other than a multifunction peripheral, such as printer and facsimile devices that can be controlled with a printer driver.

What is claimed is:

1. An information processing device in which a printer driver for causing to perform printing processing is installed in a memory storage, and which is provided with an editable tab on a settings screen of the printer driver such that an item can be selected by a user, the information processing device comprising:
   a controller connected to the memory storage storing instructions that, when executed by the controller, cause the controller to:
   in a state where information about the editable tab has been registered in an external device capable of executing printing instructions, make an acquisition request for information about the registered editable tab to the external device via the printer driver;
   receive the information about the registered editable tab transmitted by the external device in response to the acquisition request; and
   cause the received information about the editable tab to be reflected in the editable tab of the printer driver.

2. The information processing device according to claim 1, wherein registration of information about the editable tab in the external device is possible for the item which is based on an optional configuration usable by printing.

3. The information processing device according to claim 1, wherein registration of information about the editable tab in the external device allows an administrator to set an item for which use by a user is restricted, or an item which is recommended to be used by the user.

4. The information processing device according to claim 1, wherein the controller is further caused to sets a restriction on the item in the editable tab that reflects the information transmitted from the external device according to a user permission.

5. The information processing device according to claim 1, wherein the registered editable tab of the printer driver is provided with a standard configuration prior to receiving the information about the registered editable tab.

6. The information processing device according to claim 1, wherein a prescribed button is displayed on the settings screen of the printer driver, as a result of the user selecting the prescribed button, the controller is further caused to makes the acquisition request for the information about the editable tab.

7. The information processing device according to claim 1, wherein the acquisition for information about the editable tab is opening the printer driver.

8. The information processing device according to claim 1, wherein the item in the editable tab is not set in a displayed settings screen prior to receiving the information about the registered editable tab.

9. The information processing device according to claim 1, wherein the information about the registered editable tab is editable with the printer driver.

10. An information processing system comprising an external device and an information processing device, wherein the information processing device has a printer driver installed in a memory storage for causing to performing printing processing, and is provided with an editable tab on a settings screen of the printer driver such that an item is selectable by a user, and the information processing device includes a controller connected to the memory storage that, in a state where information about the editable tab has been registered in the external device capable of executing printing instructions, makes an acquisition request for information about the registered editable tab to the external device via the printer driver; receives the information about the registered editable tab transmitted by the external device in response to the acquisition request; and causes the received information about the editable tab to be reflected in an editable tab of the printer driver.

11. A control method of an information processing device in which a printer driver for causing to perform printing processing is installed, and which is provided with an editable tab on a settings screen of the printer driver such that an item is selectable by a user, the method comprising:

acquisition requesting for making, in a state where information about the editable tab has been registered in an external device capable of executing printing instructions, an acquisition request for information about the registered editable tab to the external device; and receiving for receiving the information about the registered editable tab transmitted by the external device in response to the acquisition request; and reflecting for causing the received information about the editable tab to be reflected in an editable tab of the printer driver.

12. The control method of the information processing device according to claim 11, wherein registration of information about the editable tab in the external device is made available for the item which is based on an optional configuration that is usable by printing.

13. The control method of the information processing device according to claim 11, wherein registration of information about the editable tab in the external device is made permissible for an administrator to set an item for which use by a user is restricted, or an item which is recommended to be used by the user.

14. The control method of the information processing device according to claim 11, wherein the method further comprises setting a restriction on the item in the editable tab that reflects information transmitted from the external device according to a user permission.

15. The control method of the information processing device according to claim 11, wherein the registered editable tab of the printer driver is provided with a standard configuration prior to receiving the information about the registered editable tab.

16. The control method of the information processing device according to claim 11, wherein the method further comprises displaying a prescribed button on the settings screen of the printer driver, as a result of the user selecting the prescribed button, and making the acquisition request for information about the editable tab.

17. The control method of the information processing device according to claim 11, wherein the acquisition for information about the editable tab is opening the printer driver.

18. The control method of the information processing device according to claim 11, wherein the item in the editable tab is not set in a displayed settings screen prior to receiving the information about the registered editable tab.

19. The control method of the information processing device according to claim 11, wherein the information about the registered editable tab is editable with the printer driver.

* * * * *